Feb. 6, 1968   J. R. PARRISH   3,368,128
STEP MOTOR CONTROL CIRCUIT INCLUDING A VOLTAGE
CONTROLLED OSCILLATOR
Filed April 29, 1965

INVENTOR
JOSEPH REGINALD PARRISH
BY
Shoemaker and Mattare
ATTORNEYS

United States Patent Office 3,368,128
Patented Feb. 6, 1968

3,368,128
STEP MOTOR CONTROL CIRCUIT INCLUDING A VOLTAGE CONTROLLED OSCILLATOR
Joseph Reginald Parrish, Richmond, England, assignor to Parrish Instruments Limited, Richmond, England, a British company
Filed Apr. 29, 1965, Ser. No. 451,729
Claims priority, application Great Britain, May 1, 1964, 18,244/64
3 Claims. (Cl. 318—138)

ABSTRACT OF THE DISCLOSURE

Control of stepping motors and the like in which a feedback or induced voltage through an oscillator controls the speed of the motor in accordance with its speed and/or load.

---

This invention relates to electric motors with more especial reference to those known as stepping motors, stepper motors, M-motors, or motors suitable for carrying out stepping operations, generally two- or three-phase motors.

Such motors may operate with three or more steps per revolution according to stator winding and rotor configuration.

The invention provides velocity and/or power controlled stepper motor systems embodying two principles which are believed to be unique.

(1) The broad principle of allowing a stepping motor to control its own velocity and/or power according to the dictates of its load; and (2) That relating to the technique involved in obtaining the necessary control voltage from a standard stepping motor.

Figure 1:
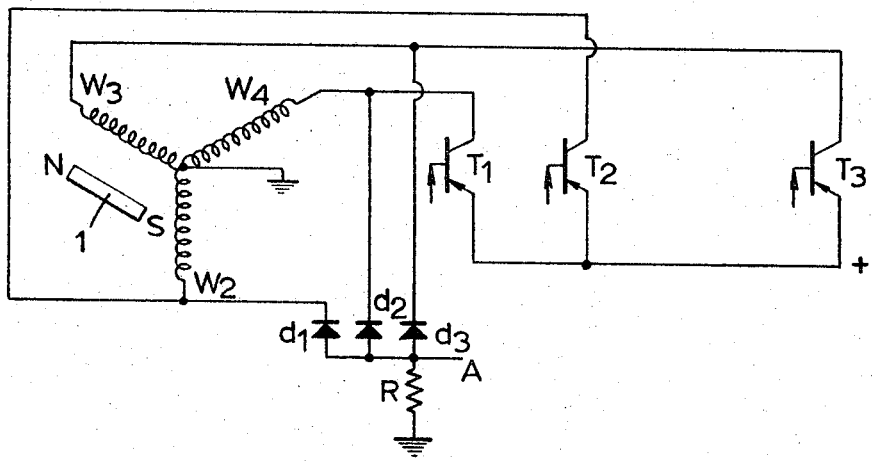
Figure 2:
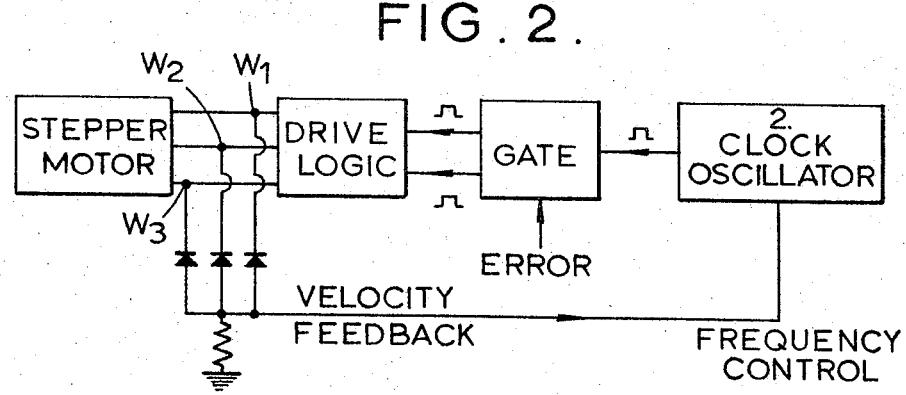

The invention will be further described with reference to the accompanying drawings wherein;

FIGURE 1 is a schematic circuit diagram showing a three coil stepping motor in which each coil is energised by a transistor switch protected by a diode, and FIGURE 2 is a schematic diagram illustrating one method of using induced voltage from a motor to control the frequency of a clock oscillator and thus govern the speed of the motor.

The control utilizes the generation of induced voltage in the unenergised coils of the motor as its polarized rotor rotates and in the circuit given in FIGURE 1, a conventional way of drawing a three-phase stepping motor is shown. Transistors T1, T2 and T3 are energised in sequence from a logic circuit, causing stepping motor rotor 1 to follow the rotating magnetic field thus set up. In order to protect the transistors T1, T2 and T3, diodes or rectifiers $d_1$, $d_2$ and $d_3$ are included in the circuit and are normally earthed at point A. In the case described, however, a small resistor R is included between point A and earth. Due to the polarity of the diodes, current will not flow whilst any of coils or windings W1, W2 or W3 of the motors are energised by their respective transistors T1, T2 and T3.

When the motor is rotating and current to the windings W1, W2, W3 is being interrupted regularly, an E.M.F. is generated in the disconnected windings in opposition to the applied E.M.F.

Due once again to the polarity of the diodes $d_1$, $d_2$, $d_3$ a current flows through one of the diodes and the resistor R. The current flowing increases with motor speed to saturation point and hence a voltage appears between point A and earth.

This control or feed-back voltage can be used in a variety of ways.

In general, stepping motors can run at a speed in excess of the speed at which they will lock. For instance, in the system diagrammatically shown in FIGURE 2, if the feedback is omitted as in the conventional case oscillator 2 has to run at a frequency at which the motor will lock. The purpose of the invention is to allow the motor to run at its maximum rate, when conditions allow, and to run at lower speeds when load conditions demand such a reduction. Control is effected in the following way:

A feedback voltage from the motor (that is to say that developed across resistor R as described earlier) is fed to a clock oscillator 2, that is to say a voltage controlled oscillator, whose frequency varies in proportion to the magnitude of the applied voltage. The lower frequency limit of said oscillator is set to suit the motor and its load. With a particular load the motor will start and accelerate to a particular upper frequency. If the motor load is increased the phase relationship between rotor 1 and the rotating field changes, producing a reduction the magnitude of the voltage across register R which in turn reduces the oscillator frequency. This effect continues until equilibrium is reached and the motor can drive the load. The lower limit of oscillator frequency is set such that the system shall be self-starting.

The feed-back voltage may also be used to control the voltage of the field winding W1, W2, W3, in which case the stepping motor behaves as a D.C. motor, that is to say, sufficient back E.M.F. is generated to reduce the input voltage to a considerable degree as in a series resistance motor. By monitoring the feed-back voltage the input voltage may be increased to compensate for this and stepping motors which are designed to operate on a voltage which will not overheat windings in the static or locked condition may be fed from increased voltage sources as their velocity increases with a corresponding gain in performance. This removes one of the serious limitations of the stepping motor, i.e., its poor high speed performance. As long as a minimum frequency is maintained by the oscillator 2 the motor is self-starting, self-regulating and self-protecting, that is, it cannot draw excessive current whilst in the starting condition.

The feed-back voltage can also be used as an information monitor in control systems. For example in a conventional closed servo loop, the A.C. or D.C. motor drives may be replaced by a stepping motor. For example in the embodiment shown in FIGURE 2 a gate is interposed between the oscillator and the switching means governing successive energization of the motor field coils. This gate may be controlled by the error signal between a pair of conventional error detectors in such a manner that when error signals are small the stepping motor will rotate in the correct sense and with the maximum acceleration which its load will permit and when the error signal falls below a preset threshold value, the gate operates to interrupt the supply of pulses from the oscillator.

The feed-back voltage information can be processed in a variety of circuits for use in linear and non-linear systems. For example, differentiator circuits can be used in acceleration feed-back systems and other circuits can be devised to meet extreme conditions of frictional load and inertial load fluctuations.

I claim:

1. A stepper motor having a magnetically polarized rotor, a plurality of field coils, a shunt path across each coil comprising a unidirectional conducting device for each coil in series with a single resistive impedance common to all the coils, a direct current supply source, switching means for energizing the various coils in sequence with direct current from said source, said unidirectional conducting devices having polarities such that they do not conduct the energizing current and means responsive to the voltage developed across said resistive impedance for controlling the switching frequency, said responsive means comprising a voltage controlled oscillator the output pulses from which sequentially operate the switching means for energizing the motor coils, the voltage across said resistive impedance being utilized as the control voltage of said oscillator, an increase in the control voltage causing an increase in the oscillator output frequency and a fall in the control voltage causing a decrease in oscillator output frequency.

2. A stepper motor according to claim 1, including a gating mechanism responsive to an error signal derived from a closed loop system of which said stepper motor forms a part, said gating mechanism being arranged to interrupt the supply of output pulses fed from the oscillator to the switching means for sequentially energizing the motor field coils when the error signal falls below a preset threshold value.

3. In a position control system in which rotational movement is to be effected in accordance with a position error signal; the combination of a stepper motor having a magnetically polarized rotor and a plurality of field coils with a control system comprising a direct current supply source having first and second terminals, a solid state switching system for connecting said first terminal sequentially to one end of each field coil to supply energizing current to said coil, a connection from the other end of each field coil to said second terminal, a separate unidirectional conducting device for each coil having first and second poles, means connecting the first pole of each unidirectional conducting device to said one end of the respective coil, a single resistive impedance connected between said second terminal of the supply source and said second poles of each of said unidirectional conducting devices, the unidirectional conducting devices having polarities such that they do not conduct the energizing current, a voltage controlled oscillator having an output frequency dependent on an applied control voltage, means applying the voltage developed across the said resistive impedance to said voltage controlled oscillator said oscillator being arranged so that its output frequency increases above a predetermined minimum when said voltage is applied, a signal controlled gate circuit arranged to gate the output pulses from said oscillator, means applying said error signal to said gate circuit to control the output thereof and means applying the output from said gate circuit to said solid state switching system to control the sequential switching of the energizing current to said coils.

References Cited
UNITED STATES PATENTS

| | | | |
|---|---|---|---|
| 2,814,769 | 11/1957 | Williams | 318—138 |
| 2,905,876 | 9/1959 | Hillman | 318—331 |
| 3,027,505 | 3/1962 | Auld | 318—331 |

ORIS L. RADER, *Primary Examiner.*

G. SIMMONS, *Assistant Examiner.*